United States Patent
Krumpelman et al.

(10) Patent No.: US 10,635,175 B2
(45) Date of Patent: Apr. 28, 2020

(54) METHOD AND SYSTEM FOR PROVIDING HAPTIC FEEDBACK USING AN INPUT DEVICE

(71) Applicant: Synaptics Incorporated, San Jose, CA (US)

(72) Inventors: Douglas M. Krumpelman, Winthrop, WA (US); Richard Schediwy, Union City, CA (US)

(73) Assignee: Synaptics Incorporated, San Jose, CA (US)

( * ) Notice: Subject to any disclaimer, the term of this patent is extended or adjusted under 35 U.S.C. 154(b) by 50 days.

(21) Appl. No.: 15/994,673

(22) Filed: May 31, 2018

(65) Prior Publication Data
US 2019/0369729 A1    Dec. 5, 2019

(51) Int. Cl.
*G06F 3/01* (2006.01)
*G06F 3/041* (2006.01)
*G06F 3/0354* (2013.01)

(52) U.S. Cl.
CPC .......... *G06F 3/016* (2013.01); *G06F 3/03547* (2013.01); *G06F 3/041* (2013.01)

(58) Field of Classification Search
CPC ....... G06F 3/016; G06F 3/03547; G06F 3/041
See application file for complete search history.

(56) References Cited

U.S. PATENT DOCUMENTS

2016/0124511 A1\* 5/2016 Takeshi ................... G06F 3/016 345/157

\* cited by examiner

*Primary Examiner* — Stacy Khoo
(74) *Attorney, Agent, or Firm* — Ferguson Braswell Fraser Kubasta PC (57) ABSTRACT

The invention relates to a haptic feedback system. The haptic feedback system includes a mounting frame configured to interface with an assembly chassis, and a mounting plate configured to support a user input device that provides a haptic feedback to a user. The mounting plate is slidably mounted on the mounting frame. The haptic feedback system further includes a guide disposed on the mounting plate, two opposing lever arms that are pivotably mounted on the mounting frame, and an actuator configured to pivot the two opposing lever arms in opposing directions. The two opposing lever arms are pivoted to cause movement of the mounting plate via the guide.

20 Claims, 6 Drawing Sheets

METHOD AND SYSTEM FOR PROVIDING HAPTIC FEEDBACK USING AN INPUT DEVICE

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Haptic feedback devices are widely used within input devices as a method to give the user haptic feedback based on the input. Generally, users appreciate the haptic feedback as a confirmation that the inputs are being processed.

SUMMARY

In general, in one aspect, one or more embodiments relate to a haptic feedback system comprising a mounting frame configured to interface with an assembly chassis; a mounting plate configured to support a user input device that provides a haptic feedback to a user, wherein the mounting plate is slidably mounted on the mounting frame; a guide disposed on the mounting plate; two opposing lever arms that are pivotably mounted on the mounting frame; and an actuator configured to pivot the two opposing lever arms in opposing directions, wherein the two opposing lever arms are pivoted to cause movement of the mounting plate via the guide.

In general, in one aspect, one or more embodiments relate to a method for providing a haptic feedback to a user, the method comprising obtaining a haptic feedback command signal; pivoting, by an actuator, and based on the haptic feedback command signal, two opposing lever arms in opposing directions; translating, by the two opposing lever arms, a pivoting motion into a linear motion that is transmitted to a mounting plate; and transmitting the linear motion of the mounting plate to a user input device configured to provide the linear motion to the user as the haptic feedback.

In general, in one aspect, one or more embodiments relate to a mounting plate of a haptic feedback system, the mounting plate comprising a mechanical interface to a mounting frame, the mechanical interface disposed on a first surface of the mounting plate and comprising pins that interface with bearing pockets disposed in the mounting frame, wherein the pins interfacing with the bearing pockets linearly restrict motion of the mounting plate relative to the mechanical interface; a guide disposed on the first surface of the mounting plate, wherein the guide is configured to be actuated by an actuator that causes the linear motion of the mounting plate; and a mechanical interface to a user input device, disposed on a second surface, opposite to the first surface, on the mounting plate, wherein the mechanical interface transmits the linear motion of the mounting plate to the user input device.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

Various embodiments of the present invention provide input devices and methods that facilitate improved usability. This improved usability for the user is achieved through haptic feedback, which provides a reactionary movement based on user input, e.g., to confirm the user's input, to provide a warning, etc.

Figure 1:
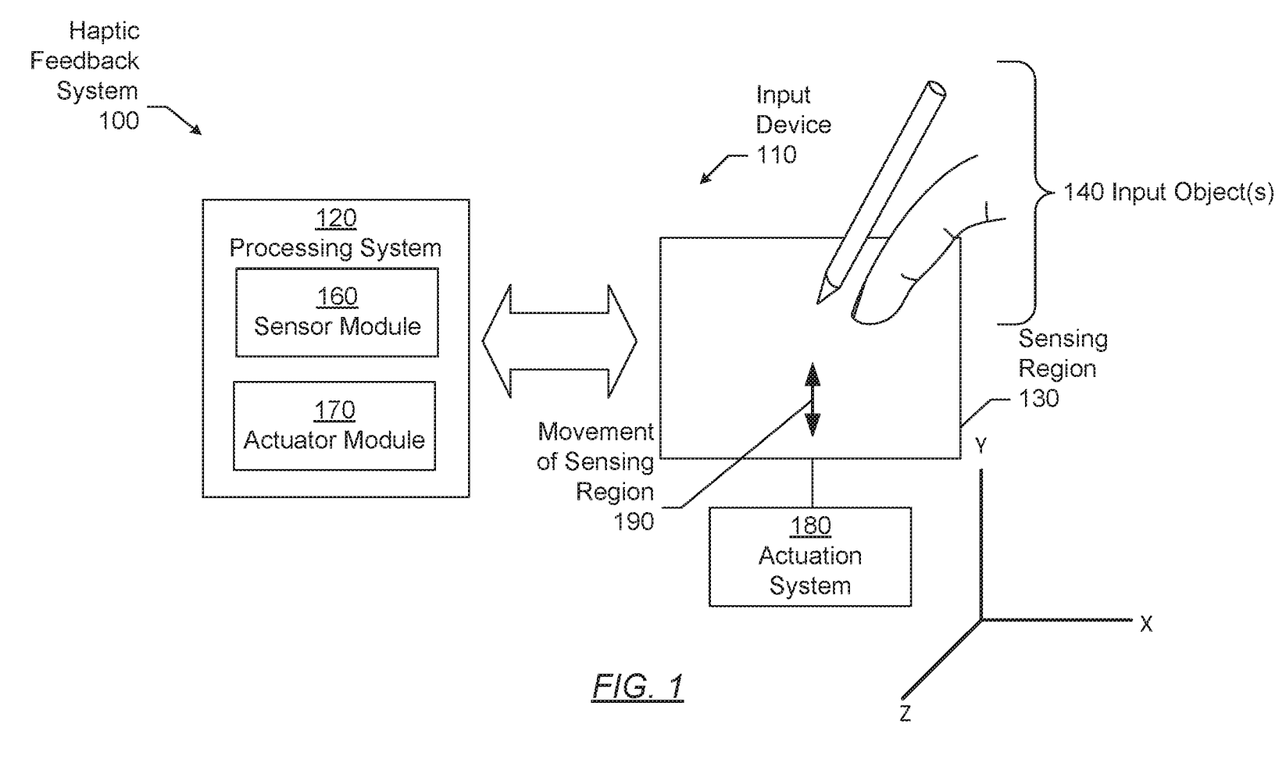
FIG. 1 is a block diagram of a system that includes a haptic feedback system in accordance with one or more embodiments of the invention.

Turning now to the figures, FIG. 1 is a block diagram of an exemplary haptic feedback system (100), which is interfacing with an input device (110), e.g. a touchpad, in accordance with one or more embodiments of the invention.

In one or more embodiments of the invention, the input device (110) is configured to provide haptic feedback to a user.

In FIG. 1, the haptic feedback system (100) includes an input device (110) that is shown as a proximity sensor device (also often referred to as a "touchpad" or a "touch sensor device") configured to sense input provided by one or more input objects (140) in a sensing region (130). Example input objects include fingers and styli, as shown in FIG. 1. Throughout the specification, the singular form of input object is used. Although the singular form is used, multiple input objects may exist in the sensing region (130). Further, which particular input objects are in the sensing region may change over the course of one or more gestures. To avoid unnecessarily complicating the description, the singular form of input object is used and refers to all of the above variations.

The sensing region (130) encompasses any space above, around, in and/or near the input device (110) in which the input device (110) is able to detect user input (e.g., user input provided by one or more input objects (140)). The sizes, shapes, and locations of particular sensing regions may vary widely from embodiment to embodiment.

The input device (110) may utilize any combination of sensor components and sensing technologies to detect user input in the sensing region (130). The input device (110) includes one or more sensing elements for detecting user input. As several non-limiting examples, the input device (110) may use capacitive, elastive, resistive, inductive, magnetic, acoustic, ultrasonic, and/or optical techniques.

In FIG. 1, a processing system (120) is shown as part of the haptic feedback system (100). The processing system (120) is configured to operate the hardware of the input device (110) to detect input in the sensing region (130) and the hardware of the actuation system (180) to provide haptic feedback via the sensing region (130). The processing system (120) includes parts of, or all of, one or more integrated circuits (ICs) and/or other circuitry components. For example, a processing system for a sensor device (not shown) may include transmitter circuitry configured to transmit signals with transmitter sensor electrodes, and/or receiver circuitry configured to receive signals with receiver sensor electrodes. Further, in some embodiments, the processing system (120) also includes electronically-readable instructions, such as firmware code, software code, and/or the like. In some embodiments, components composing the processing system (120) are located together, such as near sensing element(s) of the input device. In other embodiments, components of processing system (120) are physically separate with one or more components close to the sensing element(s) of the input device (110), and one or more components elsewhere. For example, the input device (110) may be a peripheral coupled to a computing device, and the processing system (120) may include software configured to run on a central processing unit of the computing device and one or more ICs (perhaps with associated firmware) separate from the central processing unit. As another example, the input device (110) may be physically integrated in a mobile device, and the processing system (120) may include circuits and firmware that are part of a main processor of the mobile device. In some embodiments, the processing system (120) is dedicated to implementing the haptic feedback system (100). In other embodiments, the processing system (120) also performs other functions, such as operating display screens, etc.

The processing system (120) may be implemented as a set of modules that handle different functions of the processing system (120). Each module may include circuitry that is a part of the processing system (120), firmware, software, or a combination thereof. In various embodiments, different combinations of modules may be used. For example, as shown in FIG. 1, the processing system (120) may include a sensor module (160) and an actuator module (170).

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

In one or more embodiments of the invention, the actuator module (170) includes functionality to drive the actuation system (180) to provide haptic feedback to a user via the sensing region (130) and the input object (140) The actuator module may receive and process a haptic feedback command signal to the actuation system (180) that may trigger the haptic feedback. For example a software associated with the processing system (120) issues the haptic feedback command signal to the actuation system (180). The software may be an operating system, a driver software, a user application or any other software that is configured to send haptic feedback command signals to the actuation system (180). The actuation system (180) translates the haptic feedback command signal into an electric current that drives the actuation system (180).

In one or more embodiments of the invention, the actuation system (180) causes movement of the sensing region (130) when the haptic feedback command signal is received. In one embodiment of the invention, the movement of the sensing region (130) is in a linear Y-direction, as illustrated by the arrow (190) in FIG. 1. Movement in the Y-direction may provide a tactile sensation similar to a movement in the Z direction to the user, while taking up less space than an actuation system (180) that moves in the Z-direction. Those skilled in the art will appreciate that the movement of the sensing region (130) is not limited to a linear movement in the Y-direction. For example, in other embodiments the movement may be performed in the X direction, and/or movements may be non-linear, e.g., including curvature, without departing from the invention While FIG. 1 shows a configuration of components, other configurations may be used without departing from the scope of the invention. For example, various components may be combined to create a single component. As another example, the functionality performed by a single component may be performed by two or more components.

Figure 2A:
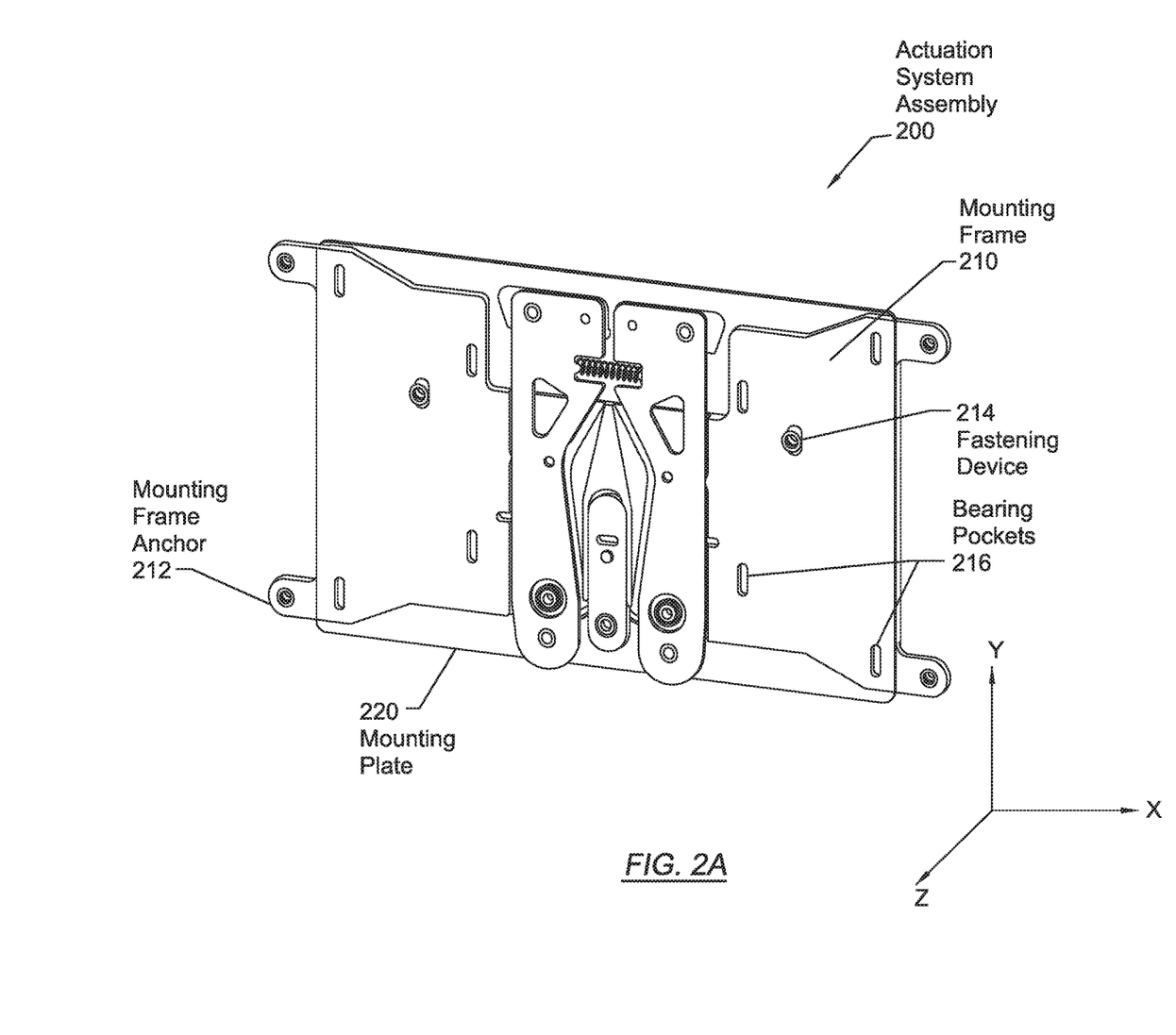
FIG. 2A is a diagram showing a top view of an actuation system assembly of the haptic feedback system in accordance with one or more embodiments of the invention.

FIG. 2A shows a top view of an exemplary actuation system assembly (200), in accordance with one or more embodiments of the invention. In the top view of the actuation system assembly (200) a mounting frame (210), a mounting plate (220) and additional elements are shown. Each of these components is subsequently described.

The mounting frame (210) anchors the actuation system assembly (200) to an assembly chassis (not shown), that could be a laptop, smartphone, keyboard, or other user input device, via mounting frame anchors (212). For example, the mounting frame (210) may be part of a laptop computer touch pad, which may require a rectangular shape to match the shape of the input device (110). The material used in this embodiment could be aluminum or another type of metal, a plastic material, or a composite material, to ensure that the actuation system assembly (200) is secured firmly to the laptop and that it can withstand any type of stress that could occur from outside forces, e.g. an item falling on the area or the laptop being dropped. Likewise, the mounting frame anchors (212) could be made of the same or similar materials to provide structural integrity. The materials and geometric shape should not be limited to this embodiment just described. For example, the geometry of the mounting frame (210) could be circular, triangular, another shape, or a different design that depends entirely on where the actuation system assembly (200) is mounted and how it will be used.

In one or more embodiments of the invention, the mounting frame (210) includes bearing pockets (216) that are used to support bearings (not shown). The bearings assist in lowering friction between the mounting frame (210) and the mounting plate (220) as the mounting plate (220) slides along the mounting frame (210) in a linear direction, as dictated by the shape of the bearing pockets (216), during the haptic feedback process. The linear motion may also be enforced by pins (not shown) of the mounting plate (220). The bearings may be pin, needle, ball, or any type of bearing that can be supported in the bearing pockets (216). The bearing pockets (216) may be aligned vertically, horizontally, diagonally, or in any direction that would provide the least amount of friction. Alternatively, the bearing pockets (216) may not house any bearings. In such an embodiment, the bearing pockets (216) would be used as a guide means to assist the mounting plate (220) in sliding in a linear direction. Those skilled in the art will appreciate that bearings and pockets are not limited to enforcing linear movements. For example, bearings may establish curved trajectories and may further be oriented in any direction, without departing from the invention.

In one or more embodiments of the invention, the mounting frame (210) is also adjoined to the mounting plate (220) via fastening devices (214). The fastening devices may be used to help secure the mounting plate (220) while still allowing for movement in a linear direction. For example, a fastening device (214) may be a plastic bolt that allows for the mounting frame (210) and the mounting plate (220) to be secured together while having a wide enough opening in a linear direction to allow for movement of the mounting plate (220) during the haptic feedback process. The size of the opening depends on how much movement is required to create the desired haptic feedback response. The material and type of fastening device (214) should not be limited to this example. For example, the material could also be carbon steel, stainless steel, aluminum, a combination of materials, or any other type of material. Likewise, the fastening device (214) may be a screw, a rod, a bolt, or any type of device that can be used to fasten the mounting plate (220) to the mounting frame (210). The material and type of bolt to be used will depend on the requirements of the actuation system assembly (200). Those skilled in the art will appreciate that fastening devices (214) may not be required depending on the layout of the actuation system assembly (200). All components of the actuation system (200), such as the mounting frame (210) and mounting plate (220), could be positioned in such a way inside the assembly chassis that no outside force could reposition the actuation system (200), therefore, fastening devices (214) could be foregone.

The mounting plate (220), in accordance with one or more embodiments of the invention, supports the user input device (110) such as, for example, a touchpad or a touchscreen (not shown). Inputs may be received from the user input device (110) along the Z-Axis, mostly perpendicular to the mounting plate (220), e.g., as a user's finger comes in contact with the touchpad. The user may then move his finger in an X-Y plane, on the surface of the touchpad. While the finger is in contact with the user input device (110), movement, generated by components of the actuation assembly (200), may be transmitted to the user's finger via the mounting plate (220) and the user input device (110) mounted onto the mounting plate (220), thereby providing haptic feedback to the user. The mounting plate (220) may take on a similar geometry as the mounting frame (210), but is not limited to the geometry of the mounting frame (210). For example, the mounting plate maybe rectangular, as shown in FIG. 2A. Other geometries could be square, circular, triangular, a different shape, or any type of design that can secure the user input device (110). Likewise, the mounting plate (220) may be made from a similar material to the mounting frame (210), but is not limited to the material of the mounting frame (210). The material could be plastic, carbon steel, aluminum, stainless steel, a combination of materials, or another type of material.

Figure 2B:
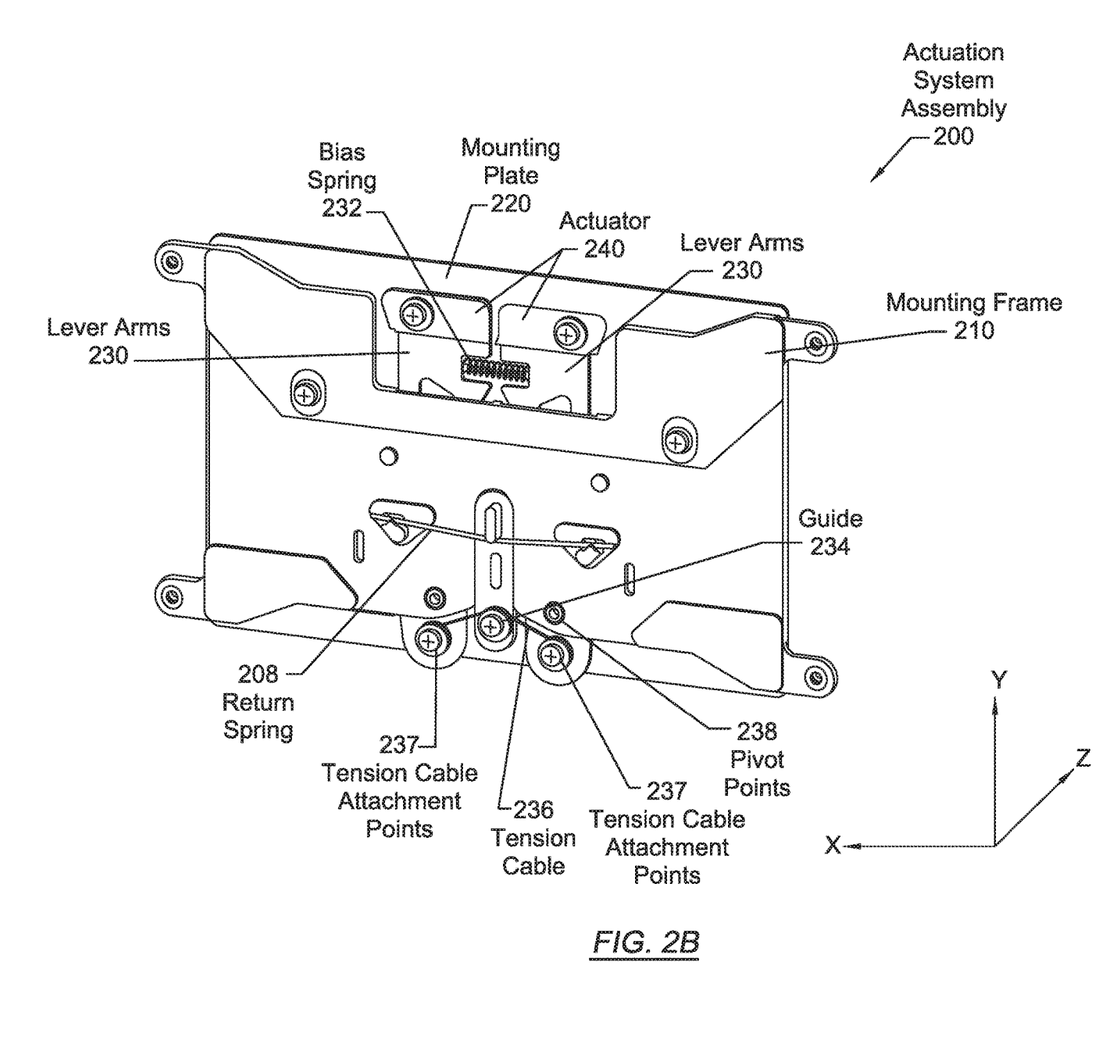
FIG. 2B is a diagram showing the bottom view, opposite the top view, of the actuation system assembly in accordance with one or more embodiments of the invention.

FIG. 2B shows the bottom view of the actuation assembly (200), in accordance with one or more embodiments of the invention. In the bottom view of the actuation system assembly (200), lever arms (230), an actuator (240), a tension cable (236), tension cable attachment points (237), a guide (234), pivot points (238), a return spring (208), and a bias spring (232) are shown, in addition to previously introduced elements. Each of these components is subsequently described.

The lever arms (230), in accordance with one or more embodiments of the invention, generate the actual movement in the actuation system assembly (200), when actuated by the actuator (240), as subsequently described with reference to FIG. 2C. The two lever arms (230) are pivotally connected to the mounting frame (210) via pivot points (238). The lever arms may be made of various materials such as sheet metal, a plastic or composite material, etc. Further, the pivot points (238) may be implemented in various ways. For example, a pivot point may be established by a pin and a bushing. Any types of joints that allow the lever arms (230) to pivot relative to the mounting frame (210) may be used.

The actuator (240), in accordance with an embodiment of the invention, is disposed between the lever arms (230), as illustrated in FIG. 2B. The actuator (240) may be a contracting or an expanding actuator. In one embodiment of the invention, the actuator is a shape memory alloy (SMA) actuator. The SMA actuator may contract when heated, e.g., when an electric current is applied. Similarly, the SMA actuator may expand when cooling. A heatsink provided in the vicinity of the SMA actuator may accelerate the cooling, thereby enabling higher actuation frequencies. Alternatively, the actuator may be an electromagnetic or piezoelectric actuator, or any other actuator that is capable of a length change to narrow or widen the space between the lever arms (230) in the region where the actuator attaches to the lever arms (230).

The tension cable (236), in accordance with an embodiment of the invention, is disposed between the two tension cable attachment points (237). The tension cable may be made of aluminum, carbon steel, stainless steel, a polymer, a combination of materials, or any material that will allow for some tension. The tension cable attachment points (237) may be any type of structure capable of affixing the tension cable (236) to the lever arms (230). For example, the tension cable attachment points may include screws or clips that produce a sufficient gripping force to withstand the tension in the tension cable (236).

Alternatively, a set of hinged rigid links may be used instead of the tension cable (236). While the tension cable may be limited to transmitting forces when tension is applied, i.e., when the spacing between the tension cable attachment points (237) widens, hinged rigid links may, in addition, be capable of transmitting forces when the spacing between the tension cable attachment points (237) narrows.

The guide (234), in accordance with one or more embodiments of the invention, is disposed on the mounting plate (220) and is configured to interface with the tension cable (236) (or with the hinged rigid links), as illustrated in FIG. 2B. Specifically, the tension cable (236) may "wrap around" the guide, to exert a force on the guide when tension is applied to the tension cable. The guide may be a bolt, a screw, a clip, or any other type of structure that enables a mechanical interface with the tension cable. The guide (234) may be made of plastic, carbon steel, aluminum, stainless steel, a combination of materials, or any type of material. A detailed description of the interaction between the lever arms (230), the tension cable (236), the tension cable attachment points (237), the guide (234) and the pivot points (238) is provided below with reference to FIG. 2C.

The bias spring (232), in accordance with one or more embodiments of the invention, is configured to counteract the force of the actuator (240). The bias spring may be disposed between the lever arms (230), configured to drive the lever arms to their initial positions, upon relaxation of the actuator (240). Accordingly, depending on the configuration of the actuator (contracting or expanding) and the location of the bias spring on the lever arms (230), the bias spring may be a compression spring or an extension spring.

In one or more embodiments of the invention, a return spring (208) is disposed between the mounting plate (220) and the mounting frame (210). The return spring may provide a force to return the mounting plate (220) to its starting position, when the actuator (240) relaxes and the lever arms (230) return to their starting positions. Accordingly the return spring (208) is configured to provide a return force that opposes the movement of the mounting plate (220), when driven by the actuator (240). The return spring (208) may be made out of aluminum, stainless steel, a combination of materials, or any other material that has elastic properties. A return spring may not be necessary if hinged rigid links rather than a tension cable (236) are used, because the hinged rigid links are capable of providing the return force originating from the biasing spring (232).

In one or more embodiments of the inventions, the two lever arms (230) are fastened to the mounting plate (220), instead of the mounting frame (210), at the pivot points (238). In this configuration, the guide (234) is fastened to the mounting frame (210) thus enabling transmission of the translational movement by the tension cable (236) to the mounting frame (210), via the guide (234).

Figure 2C:
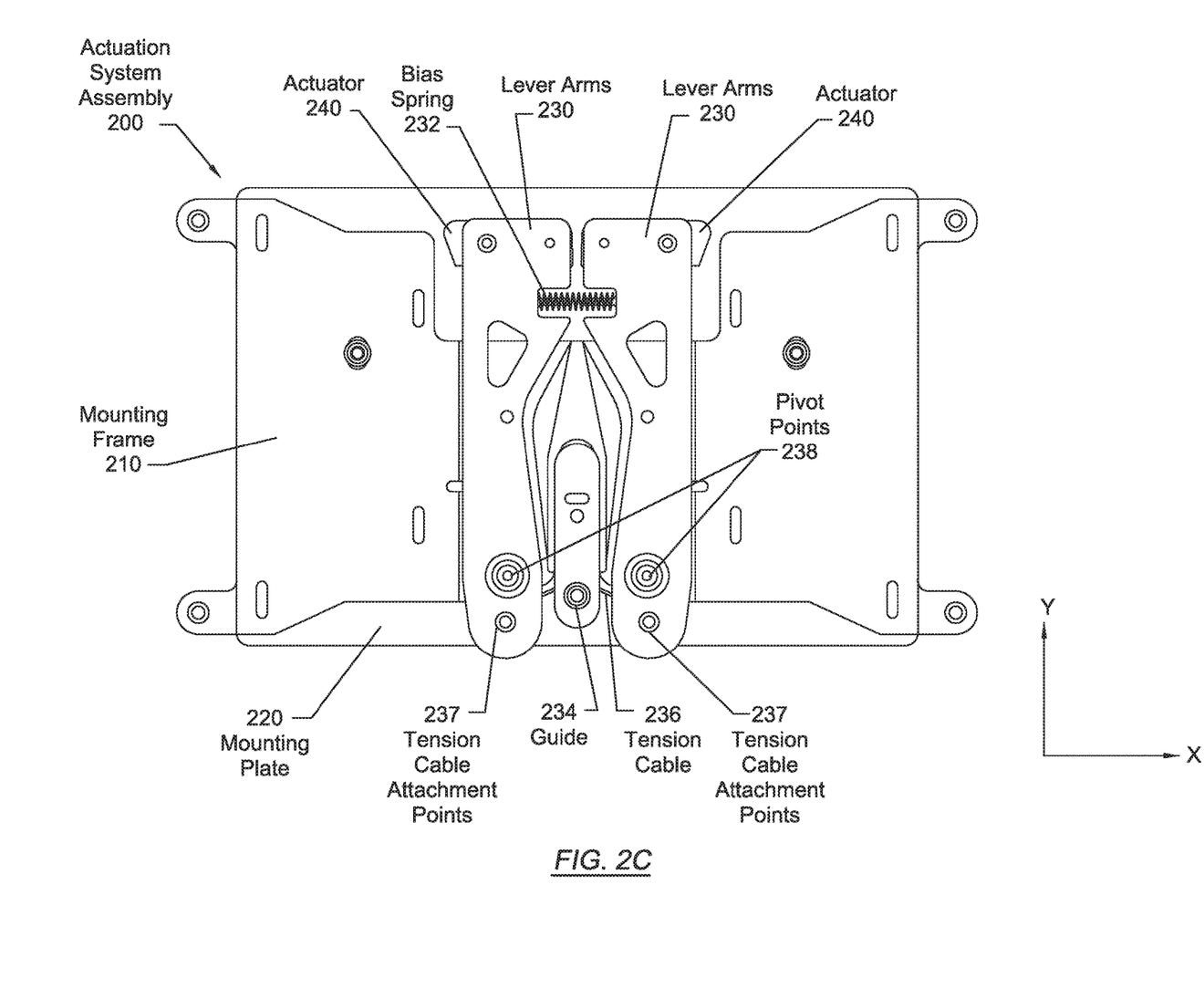
FIG. 2C is a diagram that shows the motion of the actuation system assembly when providing haptic feedback in accordance with one or more embodiments of the invention.

FIG. 2C shows the operation of an exemplary actuation system assembly (200), in accordance with one or more embodiments of the invention. In one or more embodiments of the invention, the two lever arms (230) are pulled towards each other via the actuator (240) that is adjoined to both lever arms (230). The resulting motion of the two lever arms (230) is rotational as the two lever arms (230) pivot around the pivot points (238). The restricted rotational movement is translated into an approximately linear widening of a gap (along the x-axis) between tension cable attachment points (237) of the lever arms (230). The lever arms (230) in this example are connected to the mounting plate (220) but not the mounting frame (210). As a result, when the tension on the tension cable (236) between the tension cable attachment points (237) increases, the mounting plate (220) is forced to move in a linear direction (along the y-axis), driven by the guide (234) which is in contact with the tension cable.

Alternatively, the two lever arms (230) may rotate away from each other by an expanding actuator (240). As the actuator (240) expands, the two lever arms (230) will be pushed away from each other, and when the actuator (240) relaxes, the lever arms (230) return to their rest position. This still allows for rotational motion about the pivot points (238) that is translated into an approximately linear motion at the tension cable attachment points (237).

Figure 3:
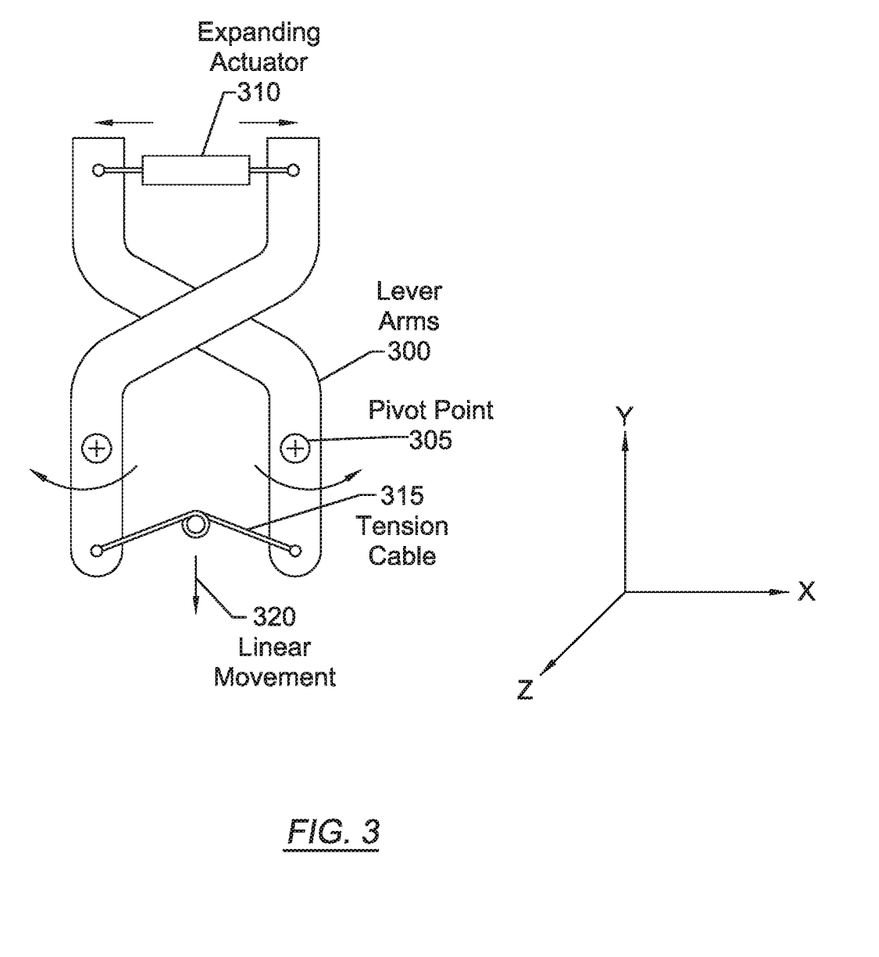
FIG. 3 shows different configurations of components of the actuation system assembly in accordance with one or more bodies of the invention.

An alternative configuration of the lever arms (300) is illustrated in FIG. 3. FIG. 3 shows a scissor-like lever arm (300) configuration in which an expanding actuator (310) also causes tension on the tension cable (315) between pivot points (305). The expanding actuator (300), when activated, drives the lever arms (300) apart by pivoting in opposite directions around the pivot points (305). This still causes linear movement (320) in the Y-Direction.

Figure 4:
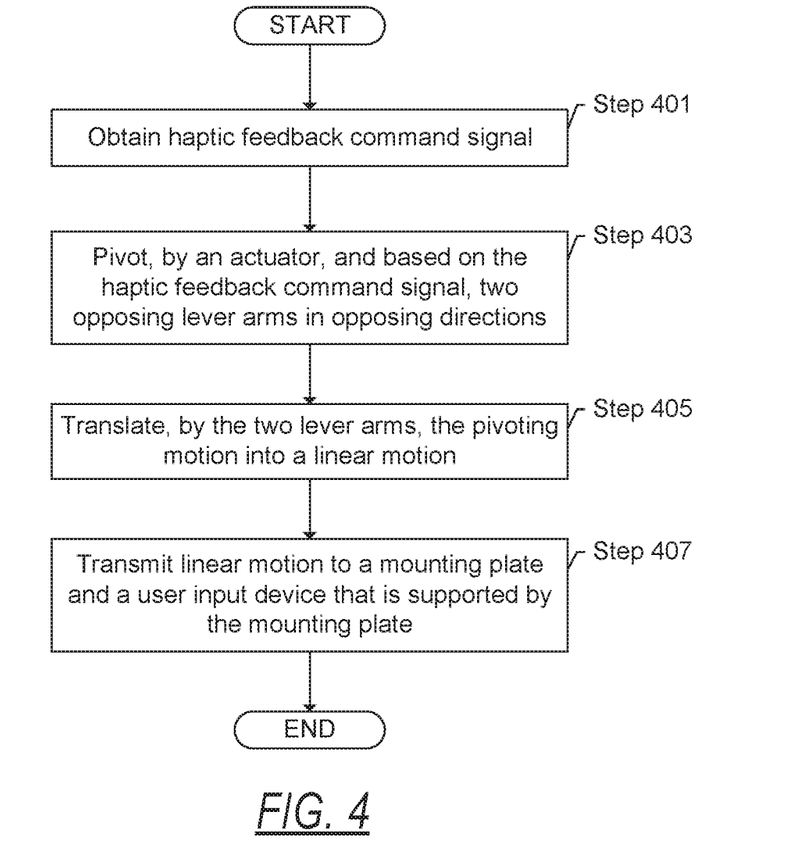
FIG. 4 shows a method flowchart in accordance with one or more embodiments of the invention.

Turning to FIG. 4, a flowchart for the haptic feedback system in accordance with one or more embodiments of the invention, is shown. In Step 401, a haptic feedback command signal is obtained by the actuator module (170). The haptic feedback command signal may be a result of a user input that was previously provided by an input object via the user input device (110). Alternatively, the haptic feedback command signal may not be related to a previous user input. For example, the haptic feedback command signal may be intended to convey a status or warning message to the user. The haptic feedback command signal, in accordance with an embodiment of the invention is then processed and sent to the actuation system (180). The processing may involve translating the haptic feedback command signal into an input suitable to drive the actuator (240), e.g., an electric current.

In Step 403, the haptic feedback command signal is received by the actuator (240). In one or more embodiments of the invention, the actuator (240) may respond to the haptic feedback command signal by expansion through heat generated by the current. This expansion may cause the two lever arms (230), which may be joined to the actuator (240) on either end, to pivot in opposing directions about the pivot points (238).

In Step 405, as a result of the pivoting about the pivot points (238), the linear distance between the tension cable attachment points (237) increases, thus causing a tightening of the tensioning cable. The tension cable, supported against the guide (234) thus exerts a force on the guide (234) along the y-axis.

In the final step, Step 407, of this embodiment of the invention, the force along the y-axis causes linear motion of the mounting plate (220), relative to the mounting frame (210). The transmission of this linear motion to the user input device (110) allows the user to experience haptic feedback via the input object (140). While not described, after completion of Step 407, the actuator (240) may relax, and the lever arms (230) and the mounting plate (220) may return to their starting positions, driven by the bias spring (232) and/or the return spring (208). Those skilled in the art will appreciate that the method may be modified to accommodate an expanding rather than a contracting actuator, without departing from the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A haptic feedback system, comprising:
   a mounting frame configured to interface with an assembly chassis;
   a mounting plate configured to support a user input device that provides a haptic feedback to a user, wherein the mounting plate is slidably mounted on the mounting frame;
   a guide disposed on the mounting plate;
   two opposing lever arms that are pivotably mounted on the mounting frame; and
   an actuator configured to pivot the two opposing lever arms in opposing directions, wherein the two opposing lever arms are pivoted to cause movement of the mounting plate via the guide.

2. The haptic feedback system of claim 1, further comprising a bias spring configured to oppose the pivoting of the two opposing lever arms.

3. The haptic feedback system of claim 1, further comprising a return spring configured to oppose the movement of the mounting plate.

4. The haptic feedback system of claim 1, wherein the slidable mounting of the mounting plate on the mounting frame constrains the movement of the mounting plate to a linear motion.

5. The haptic feedback system of claim 4, wherein the linear motion is enforced by pins of the mounting plate interfacing with bearings disposed in the mounting frame.

6. The haptic feedback system of claim 5, wherein the bearings comprise one selected from a group consisting of ball, needle, rod and bushing type bearings that support the mounting plate.

7. The haptic feedback system of claim 5, further comprising a tension cable disposed between the two opposing lever arms, and engaging with the guide, wherein the tension cable translates the pivoting of the two opposing lever arms into the linear motion of the mounting plate.

8. The haptic feedback system of claim 7,
   wherein each of the two opposing lever arms comprises a first end, a second end and a pivot point,
   wherein the actuator contracts to actuate the first ends of the two opposing lever arms,
   wherein the tension cable is disposed between the second ends of the two opposing lever arms, and
   wherein the pivot points are disposed between the first ends and the second ends of the two opposing lever arms.

9. The haptic feedback system of claim 7,
   wherein each of the two opposing lever arms comprises a first end, a second end and a pivot point,
   wherein the actuator expands to actuate the first ends of the two opposing lever arms,
   wherein the pivot points are disposed at the second ends of the two opposing lever arms, and
   wherein the tension cable is disposed between the first and the second ends of the two opposing lever arms.

10. The haptic feedback system of claim 7,
    wherein each of the two opposing lever arms comprises a first end, a second end and a pivot point,
    wherein the actuator actuates the first ends of the two opposing lever arms,
    wherein the tension cable is disposed between the second ends of the two opposing lever arms,
    wherein the pivot points are disposed between the first ends and the second ends of the two opposing lever arms, and
    wherein the two opposing lever arms cross in a region between the first ends and the pivot points.

11. The haptic feedback system of claim 5, further comprising a set of rigid links disposed between the two opposing lever arms, and engaging with the guide, wherein the set of hinged rigid links translates the pivoting of the two opposing lever arms into the linear motion of the mounting plate.

12. The haptic feedback system of claim 1, wherein the actuator is a shape memory alloy actuator.

13. The haptic feedback system of claim 12, wherein the shape memory alloy actuator is coupled to a heatsink.

14. The haptic feedback system of claim 1, wherein the actuator is a piezoelectric actuator.

15. The haptic feedback system of claim 1, wherein the actuator is a linear motor.

16. The haptic feedback system of claim 1, wherein the assembly chassis is the assembly chassis of a laptop computer.

17. The haptic feedback system of claim 16, wherein the input device is a touchpad that is configured to accept input from the user and to provide the haptic feedback to the user.

18. The haptic feedback system of claim 17, wherein the movement of the mounting plate and the touchpad, carried by the mounting plate, is in a horizontal plane of the laptop computer.

19. A mounting plate of a haptic feedback system, the mounting plate comprising:
    a mechanical interface to a mounting frame, the mechanical interface disposed on a first surface of the mounting plate and comprising pins that interface with bearings disposed in the mounting frame, wherein the pins interfacing with the bearings linearly restrict motion of the mounting plate relative to the mechanical interface;
    a guide disposed on the first surface of the mounting plate, wherein the guide is configured to be actuated by an actuator that causes a linear motion of the mounting plate; and
    a mechanical interface to a user input device, disposed on a second surface, opposite to the first surface, on the mounting plate, wherein the mechanical interface to the user input device transmits the linear motion of the mounting plate to the user input device.

20. The mounting plate of claim 19, wherein a return spring holds the mounting plate in position and allows the mounting plate to translate linear motion.

* * * * *